United States Patent [19]
Lindwedel et al.

[11] 3,807,216
[45] Apr. 30, 1974

[54] TEMPERATURE CYCLING DEVICE

[75] Inventors: James H. Lindwedel, Westminster; Clifford A. Bornschein, Garden Grove; John Devine, Mission Viejo, all of Calif.

[73] Assignee: The United States of America as represented by the Secretary of the Air Force, Washington, D.C.

[22] Filed: Sept. 15, 1972

[21] Appl. No.: 289,694

[52] U.S. Cl. ............... 73/15 R, 73/432 SD, 219/394
[51] Int. Cl. .............................................. G01n 25/00
[58] Field of Search ................. 73/15, 15.4, 432 SD; 219/388, 394, 480

[56] References Cited
UNITED STATES PATENTS

| | | | |
|---|---|---|---|
| 2,804,768 | 9/1957 | Hahl et al. | 73/15 |
| 3,680,356 | 8/1972 | Felton, Jr. | 73/15 |

FOREIGN PATENTS OR APPLICATIONS

| | | | |
|---|---|---|---|
| 1,061,545 | 7/1959 | Germany | 73/15 |
| 218,322 | 8/1968 | U.S.S.R. | 73/15 |

OTHER PUBLICATIONS

Tenney Engineering Letter 6/15/66.

*Primary Examiner*—Herbert Goldstein
*Attorney, Agent, or Firm*—Harry A. Herbert, Jr.; Arsen Tashjian

[57] ABSTRACT

A device for subjecting items, such as parts, to changes in temperature, i.e., to temperature cycles, for testing the items. In a preferred embodiment, the device includes: a plurality of stationary temperature controllable compartments, each of which is positioned at a predetermined location, and each of which has an aperture; a movable member in the shape of a close-ended right circular cylinder, which is rotatable, and which has a plurality of cavities therein, with each cavity having an opening, and with each opening of each cavity located on the cylindrical surface of the cylinder; means for rotating the cylinder; and, means for starting and stopping the rotation of the cylinder at preselected times, so that it may be moved to, stopped at, and moved from any one of the plurality of predetermined locations at which the temperature controllable compartments are positioned. When the cylinder is stopped at the locations of the compartments, the individual compartment apertures and their respective cylinder cavity openings sealingly abut; are in registration; and each compartment and each cavity together form a single chamber which, in turn, defines an enclosed temperature controllable environment. The device prevents exposure of the compartments to room temperature and, thereby, obviates the prior art delay caused by the resultant change in compartment temperature and the time then needed for the compartments to self-regulate to the originally set holding temperature(s); permits the operator/monitor to perform other tasks during the testing of the items; reduces the overall testing time; and, improves the quality of the testing and, thereby, gives more reliable results.

1 Claim, 1 Drawing Figure

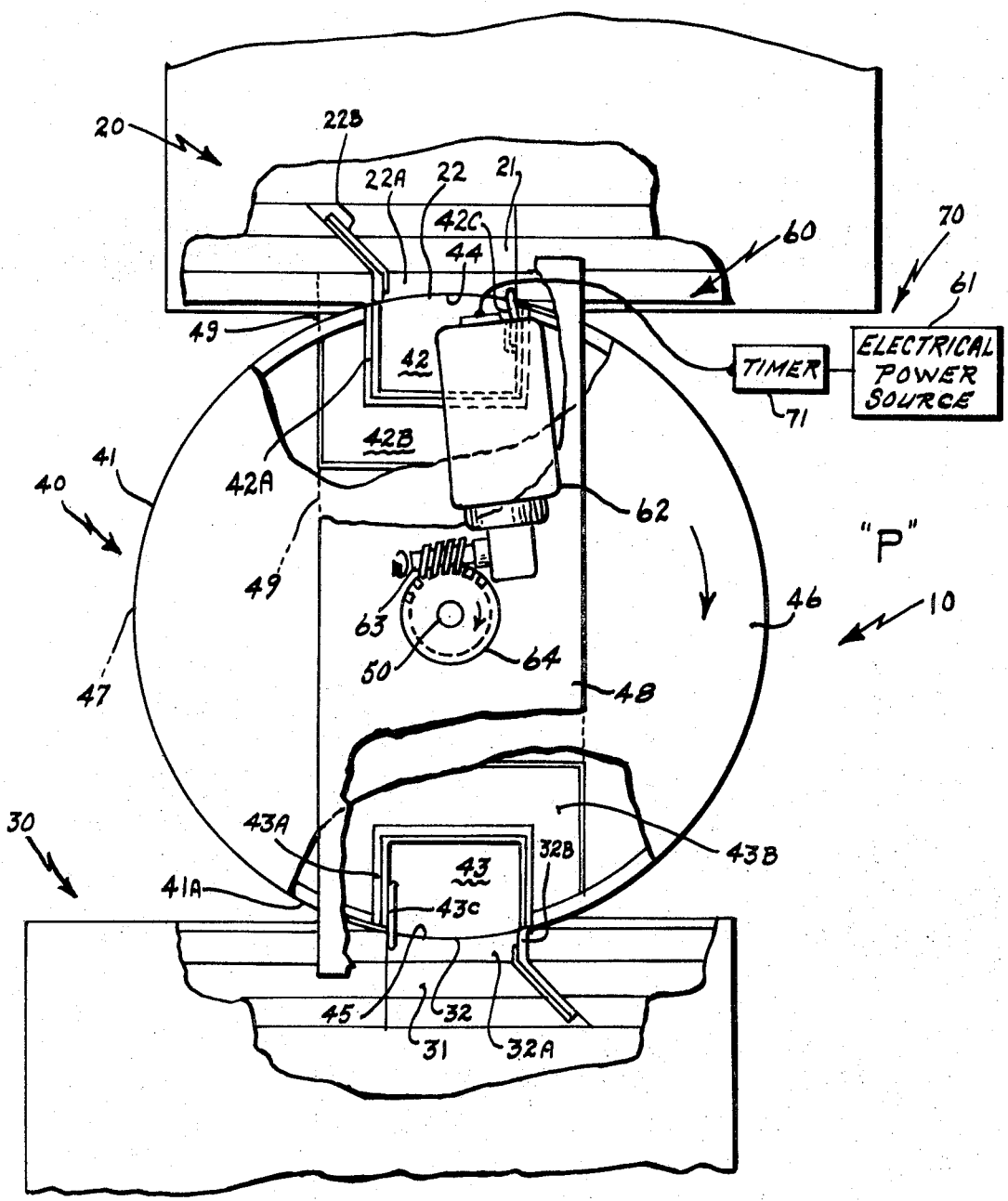

3,807,216

TEMPERATURE CYCLING DEVICE

BACKGROUND OF THE INVENTION

This invention relates to the test chamber art and, more particularly, to a novel device for subjecting items to temperature changes.

As a preliminary matter, it is to be noted that the term "items" as used herein is intended to include, but is not limited to, parts, components, articles, and the like, irrespective of whether said parts, components, articles, and the like are identical, similar, or different, and include those which are electronic or electromechanical in nature, or of that type. Additionally, the phrase "temperature changes," or the like, is intended to include, but not be limited to, discrete temperature zones (i.e., ranges or cycles), as well as a specific holding temperature or temperatures, as may be desired or as may be necessary in a particular instance.

Temperature controllable chambers (i.e., enclosed temperature controllable environments) are not per se new. They are well known in the art, and are often used to test parts, such as electrical or electromechanical components, at a temperature or at different temperatures, to identify which, if any, are defective or are otherwise not useable at that temperature or at those temperatures.

In the prior art a human operator and/or monitor inserts the parts in a temperature controllable chamber. The chamber reaches and holds, for example, a specific preset individual temperature for a preselected time. The parts are then removed from the chamber by the operator/monitor; and, the defective parts are then, or thereafter, identified by suitable means, such as visual inspection, and are discarded. The entire procedure is repeated by the operator/monitor, as needed, to test the remaining parts. This procedure has, inherently, two great and distinct disadvantages. Firstly, the procedure requires an undue amount of operator/monitor vigilance, especially when the time exposure of the parts is approximately 15 minutes or less, which effectively prevents the operator/monitor from performing other assigned tasks. Secondly, since the temperature controllable chambers conventionally are provided with a means for opening and closing the chamber, such as a door or the like, the opening and closing of the door, with exposure of the open temperature to the room environment, results in a significant temperature change in the chamber, with the result that additional time is necessary for the chamber to attain the original specific preset individual temperature which is desired, and with the added adverse result that the overall testing time is increased. In addition, the results of such testing may be unreliable.

It is clearly evident that the aforesaid disadvantages and problems currently existing in the testing art are increased and magnified if, as in most cases, the items are to be tested at different individual temperatures in different temperature controllable chambers, such as for example at "A" temperature in "B" chamber and at "C" temperature in "D" chamber.

What is currently needed in the art, and is presently not available, is an automated device which, while requiring a minimum of operator/monitor time and/or attention, essentially obviates or minimizes the above-mentioned disadvantages and problems.

We have invented such a novel device; and, thereby, we have significantly advanced the state-of-the-art.

SUMMARY OF THE INVENTION

This invention pertains to a device for subjecting an item (or items) to temperature changes by exposing the item(s) to a specific preset individual temperature (or temperatures) or through a specific preset discrete temperature range (i.e., zone or cycle) or ranges, with said device achieving, maintaining, and self-regulating to the specific preset temperature(s) or temperature range(s).

Therefore, the principal object of this invention is to provide such a novel apparatus.

Another object of this invention is to provide such an apparatus for making use of conventional temperature controllable chambers as major components of the device.

Still another object of this invention is to provide the novel above-described apparatus, which in addition to its inventive structural features is simple in construction and to operate, is reliable, and is economical to manufacture.

These objects, and other equally important and related objects, of this invention will become readily apparent after a consideration of the description of the invention and reference to the drawing.

DESCRIPTION OF THE DRAWING

The description is a top plan view, in simplified schematic form, partially fragmented and partially in cross section, of a preferred embodiment of the invention.

DESCRIPTION OF THE PREFERRED EMBODIMENT

With reference to the drawing, therein is shown a preferred embodiment 10 of the invention. The preferred embodiment 10 includes: a plurality of temperature controllable compartment units, such as 20 and 30, with each said unit having a temperature compartment, such as 21 and 31, the temperature of which said temperature compartment is controllable (i.e., is capable of achieving, maintaining, and self-regulating) both as to any preset specific temperature and/or to a preset range (or zone) of temperature limits, and with each said temperature controllable compartment, such as 21 and 31, having an aperture, such as 22 for compartment 21 and 32 for compartment 31, and with each said temperature controllable compartment (and its respective temperature controllable compartment unit) disposed at a predetermined location, such a s directly opposite to each other at a specific distance, as shown in the drawing; a movable member such as 40, having an external surface, such as 41, and with said movable member having a plurality of cavities, such as 42 and 43, with each cavity having an opening, such as 44 for cavity 42 and 45 for cavity 43, at the external surface 41 of the movable member 40; means, such as is generally designated as 60, for moving said movable member, such as 40; and, means, such as is generally designated as 70, for controlling said means, such as 60, for moving said movable member, such as 40.

Again with reference to the drawing, movable member 40 is, in preferred embodiment 10, a rotatable close-ended right circular cylinder or drum 40, with its external surface 41 being, of course, cylindrical. Cavities, such as 42 and 43, are internal of cylinder 40, and the respective cavity openings, such as 44 and 45, are located on external cylindrical surface 41 of cylinder 40, and lead from the cavity to the external cylindrical surface and vice versa. Cylinder 40 has a top or upper closed end 46 and a bottom or lower closed end 47; and, it 40 is supported in a vertical position by, and assisted in rotating by, upper bearing plate 48 and by lower bearing plate 49. Vertical shaft 50 is located at the geometric center of cylinder 40; extends into and through upper closed end 46 and upper bearing plate 48, and also into and through lower closed end 47 and lower bearing plate 49; and rotates, and/or more accurately assists in rotating, cylinder 40 preferably counterclockwise, as indicated by the arrow on upper closed end 46.

Still with reference to the drawing, the definitive means, generally designated by reference numeral 60, for rotating cylinder 40 includes, as major components, an electrical power source 61 in electrical connection with an electric motor 62. Suitable linkage connects the electric motor to a worm 63, which rotates as indicated by the arrow and which in turn rotates worm (i.e., driven) gear 64 counterclockwise, as shown by the arrow thereon; and, said driven gear 64 is connected to shaft 50 and rotates it counterclockwise.

Yet with reference to the drawing, the means, generally designated by reference numeral 70, for controlling the means 60 for moving movable member 40 includes, as a major component, an electric timer 71, preferably of the conventional on-off, selective sequential multiple-setting(s), automatic resetting, repetitive type, which is interposed between, and in electrical connection with, the electric motor 62 and the electrical power source 61. The timer 71 is capable of being used, of course, as an instantaneous on-off switch (i.e., "on" without the use of any time setting to turn if off, and "off" without the use of any time setting to turn it on), rather than a timed on-off switch.

By the use of movable member moving means 60, and the use of control means 70, the movable member, such as 40, may, at preselected times, be moved to, stopped at, and moved from any one of the plurality of the predetermined locations at which the temperature controllable compartments are disposed. Further, by use of moving means 60 and of control means 70, the movable member, such as 40, may, at any time, be moved to, stopped at, and moved from any one of the plurality of the predetermined locations at which the temperature controllable compartments are disposed; and, in addition, may, at any time, be moved to, stopped at, and moved from any location between the stationary temperature controllable compartments.

Again with reference to the drawing, each cavity, such as 42 and 43, of movable member 40 is insulated by a suitable thermal liner, such as 42A and 43A, made of appropriate material, such as asbestos. Each liner, such as 42A and 43A, is backed, in turn, by insulating foam, such as 42B for liner 42A, and 43B for liner 43A. Attached to one side of the internal surface of each cavity is a seal, such as 42C for cavity 42 and 43C for cavity 43, made of flexible and resilient material, such as rubber. Each seal, such as 42C and 43C, extends slightly beyond the opening of its respective cavity (e.g., seal 43C extends beyond opening 45 of cavity 43). Movable member, such as rotatable right circular cylinder 40, has a room temperature vulcanizing coating 41A, such as "silastic" which is manufactured by the Dow-Corning Co., on the external surface 41 of the movable member 40.

Still with reference to the drawing, each stationary temperature controllable compartment, such as 21 and 31, has a first seal, such as 22A for compartment 21, and 32A for compartment 31, at the aperture, such as 22 and 32 respectively, which partially surrounds, but does not block, obstruct, or close, the respective aperture. In addition, each stationary compartment, such as 21 and 31, has a second seal, such as 22B for compartment 21, and 32B for compartment 31, made of flexible and resilient material, such as rubber, which is attached to the internal surface of the respective compartment and which extends slightly beyond the aperture of the compartment.

It is to be noted that when a cavity, such as 43 of movable member 40, interfaces with, abuts with, and is in registration with, a compartment, such as 31, as shown in the drawing, then: (a) the seal, such as 43C, of the cavity, such as 43, extends ithe interfaced compartment, such as 31, through its aperture, such as 32; (b) the first seal, such as 32A, of the compartment, such as 31, abuts with the opening, such as 45, of the interfaced cavity, such as 43; (c) the second seal, such as 32B, of the compartment, such as 31, extends into the interfaced cavity, such as 43, through its opening, such as 45; (d) the seal, such as 43C, of the cavity, such as 43, and the second seal, such as 32B, of the interfaced compartment, such as 31, are oppositely disposed; and (e) a sealed chamber, not numbered in the interest of maintaining the clarity of the drawing, is formed by the cavity 43 and the compartment 31, and said sealed chamber, so formed, defines an enclosed temperature controllable environment. It is to be noted that the chamber is sealed since, when cavity such as 43 interfaces with a compartment such as 31, their respective seals such as 43C, 32A, and 32B, seal the periphery of the abutment of the cavity 43 and compartment 31.

MODE OF OPERATION OF THE PREFERRED EMBODIMENT

The mode of operation of the preferred embodiment 10 of our inventive apparatus is self-evident and is easily understandable by a person or ordinary skill in the art from the foregoing description of the preferred embodiment 10, coupled with reference to the drawing.

However, for those not in the art, the following succinct explanation will clearly describe the mode of operation.

As a preliminary matter, let use assume, in the interest of simplicity and brevity, that an item, such as an electronic part, is to be subjected, for testing purposes, to a low temperature of −65° C for "X" minutes and to a high temperature of +150° C for "Y" minutes, to determine the parts usability and efficacy at those holding temperatures; and, let use further assume that operator/monitor "M" is assigned the task of testing the part or, more accurately, that he is assigned the task of subjecting the part to that temperature cycle by the use of our preferred embodiment 10, and that "M" also has other tasks, unrelated to this testing, to perform during the testing of the part.

Firstly, "M" sets conventional temperature controllable compartment 31 to a holding temperature of −65°

C and temperature controllable compartment 21 to a holding temperature of +150° C. The compartments, as is conventional, will give a visual indication (such as by a thermometer, or by the lighting or the blinking of a light indicator) and/or an audible indication (such as a ringing or a buzzing) when the compartments 21 and 31 have reached the desired respective preset holding temperatures.

Then, "M" rotates cylindrical movable member 40 to a position where he is standing, intermediate of compartments 21 and 31 and generally designated in the drawing by the letter "P", so that cavity 43 is facing him. The rotation may be accomplished with the use of timer 71 which includes an instantaneous on-off switch, as previously stated.

Next, "M" inserts the part to be tested into cavity 43 and rotates and stops cylindrical movable member 40 so that the opening 45 of cavity 43 sealingly abuts with, and is in registration with, aperture 32 of compartment 31. It is here to be noted, at this time, that when movable member 40 is in such a stopped mode, opening 44 of cavity 42 sealingly abuts with, and is in registration with, aperture 22 of compartment 21; that cavity 43 and compartment 31 form a sealed temperature controllable chamber which defines a temperature controllable environment; and that cavity 42 and compartment 21 also form a sealed temperature controllable chamber which also defines another temperature controllable environment. Of course, cylindrical movable member 40 may be rotated and stopped so that cavity 43 and compartment 21 form a sealed temperature controllable chamber which defines a temperature controllable environment, and likewise cavity 42 and compartment 31 may be made to form a similar chamber.

Then, "M" sets timer switch 71 to selected sequential multiple settings for rotating and stopping rotatable cylindrical member 40, such as: "X" minutes at the cavity 43–compartment 31 chamber position; "T₁" time (which has been pre-computed and is known by "M"), so that cylinder 40 is rotated and stopped at the cavity 43—compartment 21 chamber position; "Y" minutes at the cavity 43—compartment 21 chamber position; and "T₂" time, so that cylinder 40 is rotated and stopped at the "P" position, with cavity 43 at said "P" position.

As a result of "M" having made the above-mentioned settings on timer switch 71, cylindrical movable member 40 is automatically rotated and stopped in sequence, at the preselected times, to the predetermined positions. More specifically, and in essence, cylindrical movable member 40 rotates so that cavity 43 thereof will: be moved from "P" position to the compartment 31 interface and stopped there to form the cavity 43 — compartment 31 sealed chamber, and thereby expose the part to a temperature of −65° C; by moved "X" minutes thereafter to the c ompartment 21 interface and stopped there to form the cavity 43—compartment 21 sealed chamber, and thereby expose the part to a temperature of +150° C; and, be moved "Y" minutes thereafter to the "P" position and be stopped thereat. During all of this time, "M" is, and has been, free to perform his other task, a long-sought but not previously attained goal with prior art temperature controllable chamber testing devices. Additionally, during this automated action, the chamber (or heat controllable compartments, such as 21 and 31), unlike the prior art chambers, are not exposed to room environment and there is not any resultant change in preset temperature; do not require time, and thereby cause unnecessary delay, to self-regulated to the desired preset testing holding temperature; and, eliminate, or at least minimize, any test progression delay. Further, the quality of the testing is improved and, thereby, the results are more reliable.

Then, "M" moves or extracts the part from cavity 43, and the part is visually, or otherwise inspected, by "M" or others, and identified as useable, or, if found defective, is discarded.

In summary, our inventive device obviates, or minimizes, the disadvantages and problems which are attendant to the use of the prior art devices, which said disadvantages and problems are set out above herein, and with which the person of ordinary skill is well acquainted.

While there have been shown and described the fundamental features of our invention, as applied to a preferred embodiment 10 of our inventive device, it is to be understood that various substitutions, omissions, additions, and adaptations may be made by those of ordinary skill in the art, without departing from the spirit of our invention. For example: (1) Obviously, a plurality of parts, rather than a single part, may be simultaneously tested, either by some of them being placed in each of the plurality of cavities, such as 42 and 43 or by all of the parts being placed in one cavity, such as 43; (2) The number, configuration, and relative positions of the cavities may be changed; (3) Similarly, the compartments may be changed; and (4) The compartments may be made movable and/or the cavities may be made stationary.

What is claimed is:

1. A device for subjecting items to changes in temperatures, comprising:

a. a plurality of temperature compartments, the temperature of which is controllable, with each said temperature controllable compartment of said plurality of temperature controllable compartments having an aperture, and with each said temperature controllable compartment disposed at a predetermined location;

b. a movable member in the form of a close-ended rotatable right circular cylinder having an external cylindrical surface, and with said member having a plurality of cavities, with each said cavity of said plurality of cavities having an opening located on and at said cylindrical external surface of said movable member, and with each said opening sealingly abutting with and in registration with a different one of the plurality of temperature controllable compartments, at the aperture thereof, when said movable member is in a stopped mode at any one of the plurality of predetermined locations at which said temperature controllable compartments are disposed, and, whereby, when in such a stopped mode at any one of such predetermined locations, a sealed temperature controllable chamber is formed by each said temperature controllable compartment and each said sealingly abutting cavity, with said sealed temperature controllable chamber defining an enclosed temperature controllable environment;

c. means for moving said movable member, wherein said means for moving said movable member is a means for rotating said close-ended rotatable right circular cylinder;

d. and, means for controlling said means for moving said movable member, wherein said means for controlling said means for moving said movable member is a means for controlling said means for rotating said close-ended rotatable right circular cylinder.

* * * * *